UNITED STATES PATENT OFFICE.

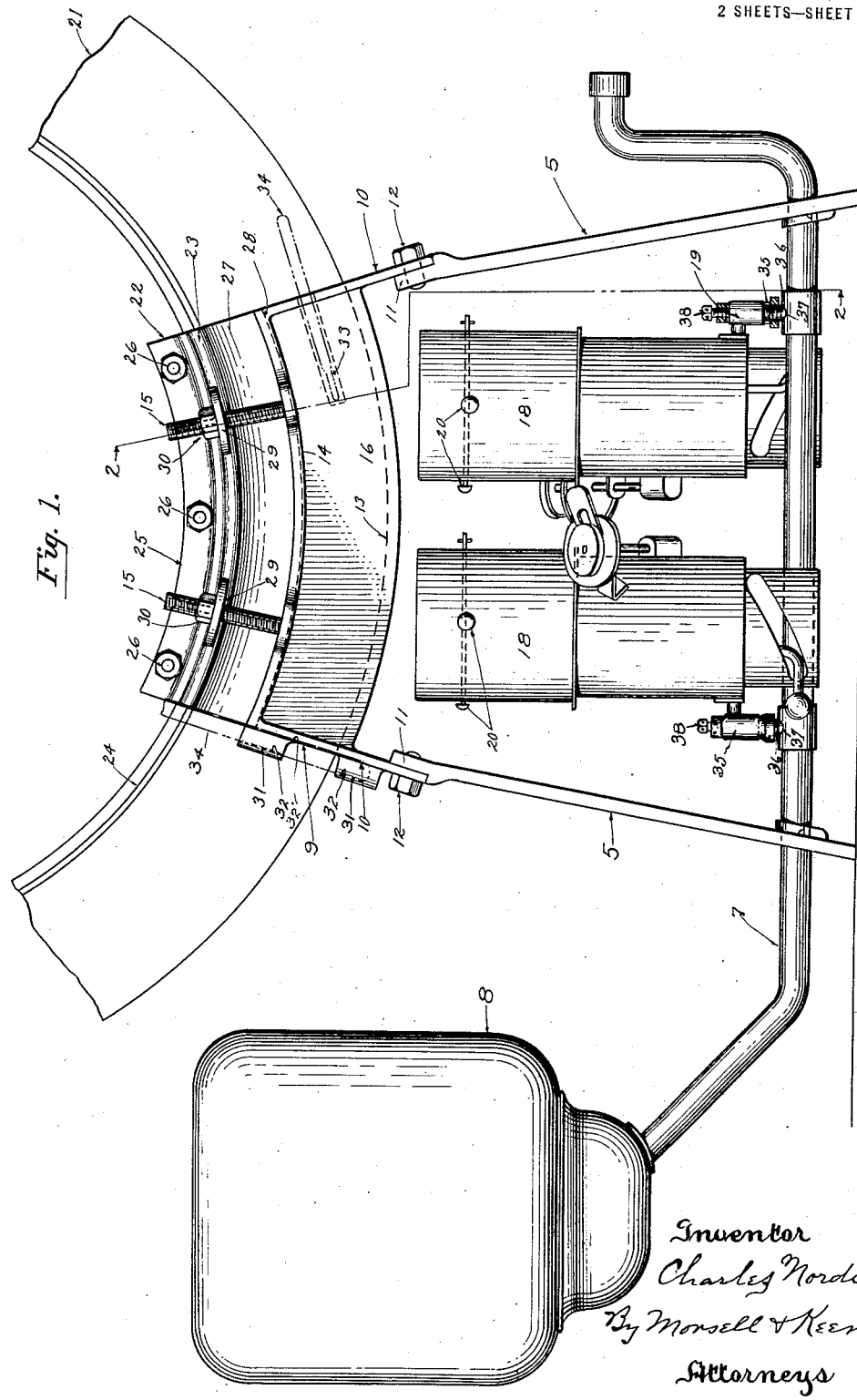

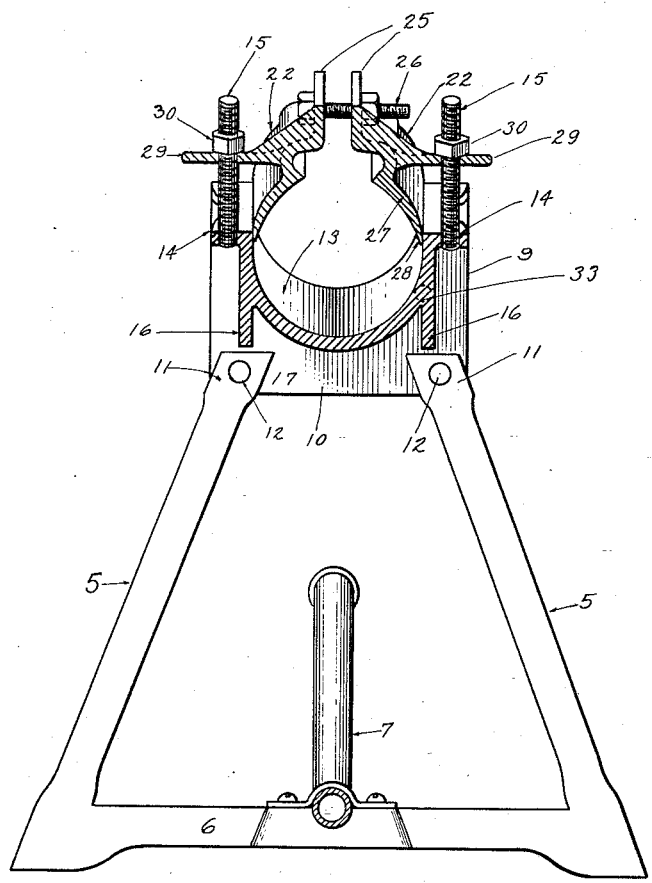

CHARLES NORDSTROM, OF MILWAUKEE, WISCONSIN.

TIRE-VULCANIZER.

1,340,973.     Specification of Letters Patent.     Patented May 25, 1920.

Application filed July 28, 1919. Serial No. 313,876.

*To all whom it may concern:*

Be it known that I, CHARLES NORDSTROM, a citizen of the United States, and resident of Milwaukee, in the county of Milwaukee and State of Wisconsin, have invented new and useful Improvements in Tire-Vulcanizers, of which the following is a description, reference being had to the accompanying drawings, which are a part of this specification.

This invention relates to certain new and useful improvements in tire vulcanizers and refers more particularly to a vulcanizer especially adapted for use in repairing pneumatic tire casings.

One object of my invention is to provide a vulcanizer of the class described, equipped with kerosene heating burners and which will be so constructed as to permit its construction and sale at a price considerably below that of the devices of this character now upon the market.

Another object of my invention is to provide a vulcanizer of the class described in which the lower mold member will be provided with spaced apart depending flanges to provide an open-heating chamber therebeneath to insure the thorough heating of the mold.

A further object of my invention is to provide a vulcanizer of the class described having a pair of complementary rim engaging clamping members adjustably connected with the lower mold member for firmly securing a portion of the tread of a pneumatic tire casing against the heated tread receiving chamber of the lower mold member, thus dispensing with the use of a core as now generally used to retain the casing tread against the tread chamber of the heating mold.

A still further object of this invention is to provide means for receiving a thermometer whereby the temperature of the lower mold member may be obtained at any time.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings I have illustrated one complete example of the physical embodiment of my invention, constructed according to the best mode I have so far devised for the practical application of the principles thereof, and in which:

Figure 1 is a side elevational view of a tire vulcanizer embodying the features of my invention, and Fig. 2 is a transverse sectional view therethrough, said view being taken on the line 2—2 of Fig. 1.

Referring now more particularly to the accompanying drawings, number 5 designates a pair of like upstanding substantially triangular-shaped supporting legs having their lower transverse portions 6 connected by means of a fuel supply pipe 7 connected with a reservoir 8; and 9 designates a lower heated mold section having end depending flanges 10 secured to the upper ends 11 of the supporting members 5 and secured thereto by fastening means 12.

The supporting members 5 thus form a rigid supporting frame for the lower heating mold 9, which is channeled and curved to form a tire tread receiving chamber 13. Laterally extending flanges 14 are formed along the upper edges of the mold 9 and have upstanding threaded studs 15 secured therein for clamping the upper mold sections thereto, as will be later described. Depending from the sides of the mold section 9 are a pair of spaced apart ribs 16 forming therebetween, on the under side of the mold, an open heating chamber 17 disposed directly above a pair of kerosene "blue flame" burners 18, carried by the supply pipe 7, as at 19. The burners 18 are of the usual construction with the exception of a pair of rods 20 passed through each burner 18 at right angles to each other whereby the two sleeves of the burners 18, not shown, will be maintained in proper spaced relation at all times.

As best shown in Fig. 1, the tire 21 is placed within the mold section 9 with the portion of its tread to be vulcanized disposed within the tread receiving chamber 13, when a pair of complementary clamping members 22 are secured thereto and then clamped to the mold section 9 to firmly hold the tread of the tire against the wall of the tire tread chamber. Each member 22 is formed on its inner face with a channel or recess 23 shaped to conform with the bead 24 of the tire; and extending upwardly from the channel 23 is a rib or flange 25 having spaced apart apertures therein for receiving clamping bolts 26. Extending from beneath the channel 23 is a downwardly and outwardly curved wall portion 27 adapted to conform with the adjacent side wall portion of the tire 21 and adapted to engage with the adjacent side wall of the tread receiving chamber 13, as at 28.

When the members 22 are clamped to the tire by means of bolts 26, they are then in a position so that the studs 15 will pass through the apertures formed in laterally projecting ears 29 formed on the members 22 adjacent to the channels 23, and are then clamped to the lower section 9 by means of the binding nuts 30.

The mold 9 is provided with thermometer receiving openings for removably receiving a thermometer 34 whereby the temperature of the mold may be readily ascertained. One thermometer opening is formed by a pair of spaced apart enlargements 31 formed on the mold at one end and having registered apertures 32 therein in line with a groove 32' in the end wall of the mold. The other thermometer opening 33 is formed in one side wall of mold as best shown in Fig. 1.

The heaters 18 are each firmly clamped to the supply pipe 7 by means of a yoke-shaped clamp 35 in threaded engagement with the threaded nipple 36 connecting the burner 18 with the supply pipe as at 37, a binding screw 38 carried by clamp 35 impinging against the union 19.

From the foregoing description taken in connection with the accompanying drawings it will be readily apparent that my vulcanizer may be used in connection with tires of various sizes, that the same may be constructed and sold at a price considerably less than the devices of this character now upon the market, and that the operating expense will be considerably reduced in that kerosene is employed in heating the mold.

What I claim as my invention is:

1. A tire vulcanizer of the class described comprising a pair of substantially triangular shaped frame members, a two piece mold having its lower section secured to the upper ends of the frame members, and kerosene burners disposed beneath the mold.

2. A tire vulcanizer of the class described comprising a pair of substantially triangular shaped frame members, a two piece mold having its lower section secured to the upper ends of the frame members, a kerosene supply pipe connecting the lower ends of the frame members and bracing the same, and a kerosene burner carried by and connected with said supply pipe, said burner heating the mold to vulcanize the tire secured therein.

3. A tire vulcanizer of the class described comprising a pair of supporting frame members, a two piece mold having its lower section secured to the upper ends of the frame members, side depending flanges formed on the under side of the lower mold and providing an open heating chamber beneath said mold, and a heater disposed beneath the mold and having its heating end juxtaposed said heating chamber.

4. A tire vulcanizer of the class described comprising a pair of supporting frame members, a two piece mold having its lower section secured to the upper ends of the frame members, side depending flanges formed on the under side of the lower mold and providing an open heating chamber beneath said mold, a heater disposed beneath the mold and having its heating end juxtaposed said heating chamber, and a thermometer receiving guide way formed in the wall of the lower mold section.

5. A mold for a tire vulcanizer comprising a lower mold section having a tread receiving chamber and lateral flanges formed on its top edges, and a top mold section including two complementary members having tire rim and side engaging portions, means adjustably clamping said complementary sections together to bind the rim of a tire therebetween, means engaging the lateral flanges of the lower section and the projecting ears of the top sections to bind the tread of the tire held between said complementary sections firmly against the walls of the tread receiving chamber, and an open heating chamber formed on the underside of the lower section.

In testimony whereof, I affix my signature.

CHARLES NORDSTROM.